United States Patent
Harvey

(10) Patent No.: US 7,617,183 B1
(45) Date of Patent: Nov. 10, 2009

(54) METHOD AND APPARATUS FOR OPERATING A DATABASE

(75) Inventor: Richard Hans Harvey, Ringwood (AU)

(73) Assignee: Computer Associates Think, Inc., Islandia, NY (US)

( * ) Notice: Subject to any disclaimer, the term of this patent is extended or adjusted under 35 U.S.C. 154(b) by 122 days.

(21) Appl. No.: 09/721,806

(22) Filed: Nov. 24, 2000

(30) Foreign Application Priority Data

Nov. 26, 1999 (AU) .................................. PQ4284

(51) Int. Cl.
*G06F 7/00* (2006.01)
(52) U.S. Cl. .............................................. 707/3; 707/2
(58) Field of Classification Search ................ 707/1–5, 707/102–103 R
See application file for complete search history.

(56) References Cited

U.S. PATENT DOCUMENTS

| | | | | |
|---|---|---|---|---|
| 4,914,571 A | 4/1990 | Baratz et al. | ................ | 364/200 |
| 5,117,349 A | 5/1992 | Tirfing et al. | ................ | 395/600 |
| 5,218,699 A | 6/1993 | Brandle et al. | ................ | 395/650 |
| 5,291,583 A | 3/1994 | Bapat | ................ | 395/500 |
| 5,317,742 A | 5/1994 | Bapat | ................ | 395/700 |
| 5,333,317 A | 7/1994 | Dann | ................ | 395/600 |
| 5,388,255 A | 2/1995 | Pytlik et al. | ................ | 395/600 |
| 5,412,804 A * | 5/1995 | Krishna | ................ | 707/2 |
| 5,414,812 A | 5/1995 | Filip et al. | ................ | 395/200 |
| 5,442,690 A | 8/1995 | Nazif et al. | ................ | 379/207 |
| 5,491,817 A | 2/1996 | Gopal et al. | ................ | 395/600 |
| 5,530,853 A | 6/1996 | Schell et al. | ................ | 395/600 |
| 5,548,726 A | 8/1996 | Pettus | ................ | 395/200.09 |
| 5,634,053 A | 5/1997 | Noble et al. | ................ | 395/604 |
| 5,649,182 A | 7/1997 | Reitz | ................ | 395/607 |
| 5,664,172 A | 9/1997 | Antoshenkov | ................ | 395/604 |
| 5,692,181 A | 11/1997 | Anand et al. | ................ | 395/613 |
| 5,794,232 A | 8/1998 | Mahlum et al. | ................ | 707/3 |
| 5,806,061 A | 9/1998 | Chaudhuri et al. | ................ | 707/3 |
| 5,864,840 A | 1/1999 | Leung et al. | ................ | 707/2 |
| 5,878,415 A | 3/1999 | Olds | ................ | 707/9 |
| 5,953,716 A | 9/1999 | Madnick et al. | ................ | 707/4 |
| 5,970,497 A | 10/1999 | Burrows | ................ | 707/102 |
| 5,987,446 A * | 11/1999 | Corey et al. | ................ | 707/3 |
| 6,003,022 A | 12/1999 | Eberhard et al. | ................ | 707/2 |
| 6,003,050 A | 12/1999 | Silver et al. | ................ | 707/536 |

(Continued)

FOREIGN PATENT DOCUMENTS

| | | |
|---|---|---|
| EP | 0 689 148 A1 | 5/1995 |
| GB | 2 329 044 A | 3/1999 |
| WO | WO 96/07147 A1 | 3/1996 |
| WO | WO 96/34350 A1 | 10/1996 |

OTHER PUBLICATIONS

M. Jarke, J. Koch, "Query Optimization in Database Systems," ACM Computing Surveys, vol. 16, No. 2, Jun. 1984, pp. 111-152, XP002229970.

(Continued)

*Primary Examiner*—Sathyanarayan Pannala
(74) *Attorney, Agent, or Firm*—Baker Botts L.L.P.

(57) ABSTRACT

A method of processing a database service query is provided. In one embodiment, the method includes receiving a service query, applying principles of logic to the service query to obtain a sum of terms, evaluating each term as one or more separate SQL instructions, and executing each separate SQL instruction. Preferably, the sum of terms is additionally expanded to remove NOT operators, using for example Boolean logic.

19 Claims, 5 Drawing Sheets

U.S. PATENT DOCUMENTS

| | | | |
|---|---|---|---|
| 6,009,422 A * | 12/1999 | Ciccarelli | 707/4 |
| 6,016,497 A | 1/2000 | Suver | 707/103 |
| 6,016,499 A | 1/2000 | Ferguson | 707/104 |
| 6,044,442 A | 3/2000 | Jesionowski | 711/153 |
| 6,052,681 A | 4/2000 | Harvey | 707/3 |
| 6,085,188 A * | 7/2000 | Bachmann et al. | 707/3 |
| 6,112,198 A * | 8/2000 | Lohman et al. | 707/3 |
| 6,112,304 A | 8/2000 | Clawson | 713/156 |
| 6,115,703 A | 9/2000 | Bireley et al. | 707/2 |
| 6,119,129 A | 9/2000 | Traversat et al. | 707/202 |
| 6,122,627 A * | 9/2000 | Carey et al. | 707/4 |
| 6,182,153 B1 | 1/2001 | Hollberg et al. | 709/315 |
| 6,192,405 B1 | 2/2001 | Bunnell | 709/225 |
| 6,195,653 B1 | 2/2001 | Bleizeffer et al. | 707/2 |
| 6,199,062 B1 | 3/2001 | Byrne et al. | 707/3 |
| 6,236,988 B1 | 5/2001 | Aldred | 707/3 |
| 6,236,997 B1 | 5/2001 | Bodamer et al. | 707/10 |
| 6,356,892 B1 * | 3/2002 | Corn et al. | 707/3 |
| 6,370,522 B1 | 4/2002 | Agarwal et al. | 707/2 |
| 6,728,720 B1 | 4/2004 | Lenzie | 707/101 |
| 6,732,360 B1 | 5/2004 | Seo et al. | 719/310 |
| 6,879,990 B1 | 4/2005 | Boyer et al. | 707/205 |
| 2001/0037339 A1 | 11/2001 | Harvey | 707/102 |
| 2002/0059199 A1 | 5/2002 | Harvey | 707/3 |
| 2003/0105749 A1 | 6/2003 | Harvey | 707/3 |
| 2003/0191759 A1 | 10/2003 | Harvey | 707/4 |
| 2003/0208478 A1 | 11/2003 | Harvey | 707/3 |
| 2006/0020613 A1 | 1/2006 | Harvey | 707/100 |
| 2008/0040365 A1 | 2/2008 | Harvey | 707/100 |

OTHER PUBLICATIONS

S. Grumbach, T. Milo, "Towards Tractable Algebras for Bags," Proc. 12th Intl. Conf. on Management of Data and Symposium on Principles of Database Systems, May 1993, pp. 49-58, XP002233522, Washington, D.C.

S.S.B. Shi, et al.; *An Enterprise Directory Solution With DB2*; IBM Systems Journal; vol. 39, No. 2; 0018-8670; pp. 360-383, 2000.

*European Patent Office Examination Report for Application No. 00 980 695.1-2201*; 5 pages, Apr. 3, 2007.

*The Directory—Overview of Concepts, Models and Services*; Recommendation X.500; Fascicle VIII 8—Rec. X.500; pp. 3-19, 1988. *CCITT the International Telegraph and Telephone Consultative Committee*; International Telecommunication Union; Blue Book; Data Communication Networks Directory; Recommendations X.500-X.521; vol. VIII; Fascicle VIII.8; 232 pages, Nov. 1988.

Molesworth, R.; *An Overview of the CCITT X.500 Directory System*; Logica CES Ltd., UK; Second IEE National Conference on Telecommunications; pp. 179-183, Apr. 2, 1989.

Stamper, David, et al.; *Database Design & Management—An Applied Approach*; Chapter 13—The Relational Model; pp. 295-323, 1990.

Cooke, Beth E., et al.; *Directory Services in the HP MAP 3.0 Environment*; 1266 Hewlett-Packard Journal; No. 4; XP-000149608; pp. 15-23, Aug. 1990.

Leung, C.M.R.; *An Object-Oriented Approach to Directory Systems*; IEEE Region 10 Conference on Computer and Communication Systems; Hong Kong; pp. 736-740, Sep. 1990.

Bauer, M.A., et al.; *A Simulation Model for X.500 Directories: Initial Experiences*; Department of Computer Science, The University of Western Ontario; pp. 255-276, 1991.

Ordille, Joann J., et al.; *Nomenclator Descriptive Query Optimization for Large X.500 Environments*; Computer Sciences Department, University of Wisconsin-Madison; SIGCOMM 91; pp. 1-12, 1991.

Perruchoud, François, et al.; *A Relational Data Base Design for an X.500 Directory System Agent*; Message Handling Systems and Application Layer Communication Protocols; pp. 405-418, 1991.

Smetaniuk, Bohdan; *Distributed Operation of the X.500 Directory*; Computer Networks and ISDN Systems; No. 1; Amsterdam, NL; XP-000177093; pp. 17-40, Mar. 1991.

Leung, C.M.R.; *GDSA: An X.500 Directory Implementation Supporting Heterogeneous Databases*; pp. 85-90, Apr. 1991.

Rumbaugh, James, et al.; *Object-Oriented Modeling and Design*; General Electric Research and Development Center, Schenectady, New York; 33 pages, Jan. 6, 1992.

Hunt, Ray; *CCITT X.500 Directories—Principles and Applications*; Computer Communications; vol. 15, No. 10; pp. 636-645, Dec. 1992.

Hong, James W., et al.; *Design and Implementation of a Distributed Applications Testbed*; Department of Computer Science, University of Western Ontario; pp. 170-174, 1993.

Heywood, Peter, et al.; *A Big Step Toward a Global Directory*; Data Communications; No. 1; pp. 99-100, Jan. 1994.

Watanabe, Kazunari, et al.; *Eliminate Information Inconsistency for X.500 Directory*; NTT Information and Communication Systems Laboratories; pp. 1180-1184, 1994.

Barker, Paul; *An Analysis of User Input to an X.500 White Pages Directory Service*; IEEE/ACM Transactions on Networking; vol. 3, No. 2; pp. 112-125, Apr. 1995.

Patent Pending U.S. Appl. No. 09/427,263 entitled *Directory Service System and Method With Tolerance For Data Entry Storage And Output* by Richard H. Harvey; 98 total pages, filed Oct. 26, 1999.

*European Patent Office Examination Report* for International Application No. 95 930 331.4-2212; 1 page, Dec. 4, 2001.

Bachmann, D., et al.; *Implement LDAP Search Queries With SQL*; IP.com PriorArtDatabase; Technical Disclosure; 7 pages, Dec. 1, 1998.

*Oracle8i; Designing and Tuning for Performance*; Release 2(8.1.6); Part No. A76992-01; XP-002229598; 94 pages, Dec. 1999.

*European Patent Office Examination Report* for International Application No. 01 930 950.9-1225; 7 pages, Dec. 4, 2006.

S.E. Kille; *Mapping the Global Naming Tree Onto A Relational Database*; Computer Message Systems—85; Elsevier Science Publishers B.V. (North-Holland), pp. 105-114, 1986.

*European Patent Office Communication* for Application No. 03 002 798.1-1225; 6 pages, Jul. 11, 2007.

Won Kim; *On Optimizing an SQL-Like Nested Query*; ACM Transactions on Database Systems; vol. 7, No. 3; pp. 443-469, Sep. 1982.

*United States Patent and Trademark Office; Office Action* for U.S. Appl. No. 10/300,885, filed Nov. 21, 2002 in the name of Richard Hans Harvey; 12 pages, Apr. 7, 2008.

Communication dated Mar. 4, 2009 from the United States Patent and Trademark Office re Harvey, U.S. Appl. No. 10/174,824, filed Jun. 20, 2002.

Communication dated Aug. 6, 2008 from the United States Patent and Trademark Office re Harvey, U.S. Appl. No. 10/300,885, filed Nov. 21, 2002.

Communication dated Oct. 29, 2008 from the United States Patent and Trademark Office re Harvey, U.S. Appl. No. 09/844,043, filed Apr. 27, 2001.

European Patent Office; The Netherlands, Substantive Examiner Ralf Abbing, Communication pursuant to Article 94(3) EPC of Nov. 28, 2008, regarding Appln. No. 01 930 950.91225 (7 pages).

Australian Government letter to Smoorenburg, Examiner's First Report on Patent Application No. 2007201141, 2 pages, Sep. 25, 2008.

Australian Government letter to Smoorenburg, Examiner's First Report on Patent Application No. 2007201142, 2 pages, Sep. 25, 2008.

Australian Government letter to Smoorenburg, Examiner's First Report on Patent Application No. 2007201143, 2 pages, Sep. 25, 2008.

Australian Government letter to Smoorenburg, Examiner's First Report on Patent Application No. 2007201145, 2 pages, Sep. 25, 2008.

Australian Government letter to Smoorenburg, Examiner's First Report on Patent Application No. 2007201149, 2 pages, Sep. 25, 2008.

Communication dated Mar. 17, 2009 from the United States Patent and Trademark Office re Harvey, U.S. Appl. No. 10/300,885 filed Nov. 21, 2002.

Communication dated Jan. 23, 2009 from the United States Patent and Trademark Office re Harvey, U.S. Appl. No. 10/336,769, filed Jan. 6, 2003.

EPO Communication pursuant to Article 94(3) EPC; Application No. 03 002 797.3-1225; Ref. HD/KT/J43358EPB, Dec. 16, 2008.

* cited by examiner

Fig. 1    Prior Art

Filter    ( & (cn = Rick) (sn = Harvey) )  ← 101

Search

| AID | NORM | EID |
|-----|--------|-----|
| 3 | JOHN | 200 |
| 3 | RICK | 101 |
| 4 | HARVEY | 101 |
| 4 | SMITH | 200 |

102 →

| AID | Attr |
|-----|------|
| 3 | cn |
| 4 | sn |

← 103

METHOD AND APPARATUS FOR OPERATING A DATABASE

BACKGROUND

1. Field

The present application relates to databases, particularly relational databases and RDBMS (Relational Database Management System) implementations. The present application also relates to databases or systems used to provide directory services, such as X.500 service directories and LDAP service directories.

2. Description of the Related Art

It is considered that there is an ongoing need to provide systems which have improved performance over prior art systems, and in particular improved performance in the features of speed, performance and/or accuracy. Certainly, users seem to constantly seek an ever increasing improvement in speed, performance and accuracy.

It is not uncommon to have hundreds of thousands, or even millions, of entries in a database. Users of applications that use database systems that store a large number of entries, such as service directories, complain that the performance (execution) of such applications is often slow. A common complaint is that if a search is performed on such a large database, the search may take seconds, minutes or hours to provide a result. From a user's perspective, this sort of delay is considered irritating. Users prefer to have little, if any, delay in operating a database system.

This perception of lack of performance or lack of speed is especially noticeable when executing a search instruction/service. In essence, the problem is that in executing a search instruction/service, the application has to take a complex directory query, such as a complex X.500 directory service query, and map that query into SQL instructions. The SQL performed is based on a table design, and these tables may use metadata. Even though the step of mapping the query is possible, conventionally the mapping is complex or produces relatively complex SQL expressions to be executed by the database application. In general, the more complex the SQL instructions, the slower the performance. Nonetheless, users want the instruction/service executed in such a way that the system exhibits higher performance.

Part of what aggravates the performance problem is that, in a metadata design, the tables tend to be very large tables. The larger a table grows, the slower the application's perceived performance. Also, if the tables are large and a complex query joins a number of the large tables the perceived performance problem may get even worse.

To illustrate this problem, an example will be described of the mapping of a relatively complex X.500 query into SQL. The problem with the mapping is that X.500 and LDAP basically gives a query language that involves AND's, OR's and NOT'S. SQL also gives a query language which involves AND's, OR's and NOT's. A complex SQL expression may use one or more joins and/or subselects. When there are a number of joins and/or subselects, the query may take a relatively long time to evaluate. There may be a number of ways to write an SQL query and if it only contains joins and not subselects then it is often termed a "flattened" query.

The illustration will be made in respect of a relatively simple example. Looking at FIG. 1, a search for an X.500 query using LDAP notation is expressed in expression 101. The search example uses a filter to look for a common name=Rick, AND surname=Harvey. The figure shows a search table 102 and also an attribute table 103 for reference. Lets suppose that attribute identifier (AID) number 3 is for the common name (cn) and AID number 4 is for the surname (sn). In the search table there are a number of AIDs. The Rick Harvey entry is EID (Entry Identifier) 101 with AID 3, corresponding to a common name 'RICK' and also EID 101 has 'HARVEY' for the normalised value. There is also another AID 3 in the table for John Smith, John who has EID 200 and Smith who has EID 200. In doing a search for Rick AND Harvey, the search will try to find all objects (EIDs) who have AID=3, norm=RICK, and AID=4, norm=HARVEY.

So, in essence, the search wants to select entries 'Rick' and 'Harvey'.

One way of doing this search is by using a subselect (or nested query). The SQL required for this is:

Select EID from search
Where AID=3 AND NORM='RICK'
AND EID IN
(select EID from SEARCH.
   where AID=4 AND NORM='HARVEY')

In this nested query, the clause in brackets is a subselect. The subselect is evaluated corresponding to where AID=4 and Norm=HARVEY and the resulting list of EIDs is saved. Then the outer clause is evaluated corresponding to where AID=4 and Norm=HARVEY such that the list of EIDs returned is also in the list of EIDs previously saved.

The problem with the sub-select is that if there are many, many 'HARVEY's a huge set will be built and there may not be many 'RICK's and thus this query will be lopsided and may take a long time to evaluate.

Another way of doing this search is by using a join (or flattened query). The SQL required for this join is:

Select S1.EID from search S1, search S2
   Where S1.AID=3.AND S1.NORM='RICK'
   AND S2.AID=4 AND S2.NORM='HARVEY'
   AND S1.EID=S2.EID The result is that if table S1 has a million entries, and table S2 has a million entries, the search may be conducted over a huge combination of entries when the tables are joined. As can be seen, even for this quite simple search/instruction, performance of an application can be severely diminished in a relatively large database. However, usually a join version of a query will be faster than a subselect.

The sub-select is equivalent to the join, and in fact many prior art database applications may convert a sub-select into a join. However, this may be too difficult if there is more than one level of nesting or the where clause is too complex.

A further example will now be discussed where a search involves a 'NOT' instruction. In other words, in this example a filter asks for 'not equal'. We are looking for 'RICK' NOT 'HARVEY' that is common name is Rick and surname not equals Harvey.

The nested query, in SQL would be:
Select EID from search
Where AID=3 AND NORM='RICK'
AND EID NOT IN
(select EID from search
where AID=4 AND NORM='HARVEY')

The flatten version of the above query may be accomplished with an outer join. An outer join is considered to be quite complex and relatively slow in execution. An outer join for this search would be something like:
   SELECT S1.EID FROM
      (SEARCH S1 LEFT JOIN SEARCH S2
         ON S1.EID=S2.EID
         AND S2.AID=4)
   Where S1.AID=3
      AND S1.NORM='RICK'
AND (S2.NORM< >'HARVEY')

Again, the above example relates to a relatively simple search for 'Rick' and not 'Harvey'; in other words, a search of sets involving set 'A' and NOT set 'B' i.e A.!B.

If we look at a search involving more complex searches, such as

A.(B+C.!D), expression 201 the SQL for this query would be (in abstract):
SELECT 'A'
AND EID IN
  (SELECT 'B' OR
    (SELECT 'C' AND EID NOT IN
      (SELECT 'D')))

Note that the above query is very difficult to flatten into an expression that involves only joins. Also, note that "!D" means "NOT D"

SUMMARY

The present application provides, in one aspect, a method of processing a directory service query. In one embodiment, the method includes receiving a service query, applying principals of logic (e.g., DeMorgan's theorem) to the service query to obtain a sum of terms, evaluating each term as one or more separate SQL instructions, and executing each separate SQL instruction. The sum of terms may additionally be expanded to remove NOT operators, using for example Boolean logic.

In a further aspect, the present application provides, in executing a separate SQL instruction, a NOT can be expanded to subtraction. Directory service arrangements and databases for implementing the present application are also contemplated. In principle, the present application simplifies complex queries by reducing the query to a set of smaller or simpler SQL queries. By expanding a search filter into a sum of terms by the application of known principles of logic (DeMorgan's theorem). If a term includes a NOT, the term including a NOT can be expanded into a sum of negative terms. The performance of queries is improved by processing a series of separate SQL statements from such expansions. Final results are achieved by combining the results of each of the separate SQL statements in a way that disregards duplicate SQL results. In one form, a term may be a set of AND operations. Furthermore, size and time limits of the instructions are improved by stopping the process of evaluating terms when a size or time limit occurs.

BRIEF DESCRIPTION OF THE DRAWINGS

A preferred embodiment of the present application will now be described, with reference to the accompanying drawings, in which:

FIG. 1 illustrates a background example of a database search;

DETAILED DESCRIPTION

The present application in its various aspects includes a number of steps. In the following description we will provide an illustrative embodiment of those steps.

Figure 2:
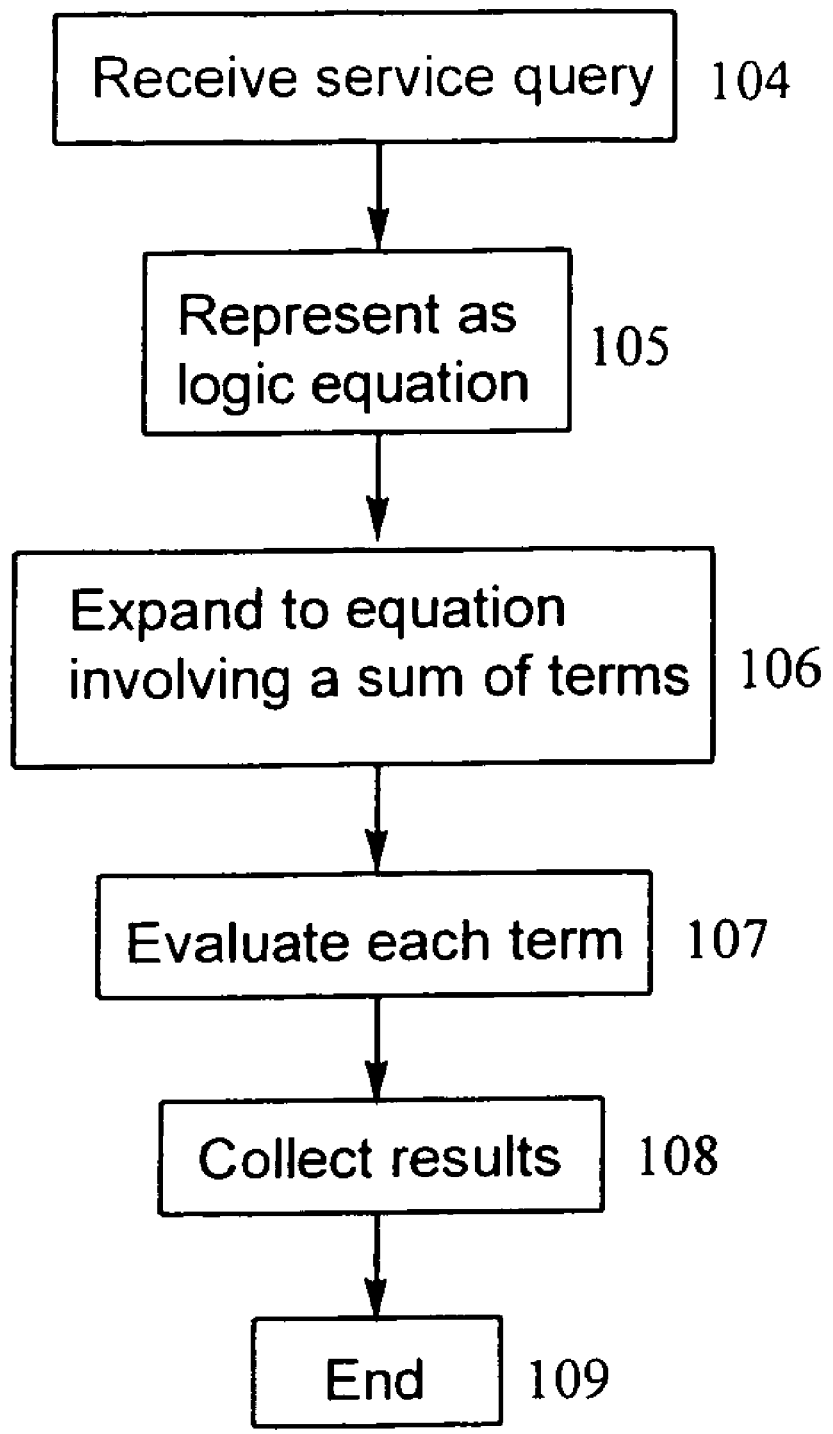
FIG. 2 illustrates schematically a general method in accordance with the present application.

With reference to FIG. 2, an outline of the invention of the present application can be seen. The present application relates to a method of and apparatus for processing a directory service query. In essence, the query is received as represented by step 104. The query is represented as a logic expression as represented by step 105. The logic expression is expanded to an expression involving a sum of terms at step 106. Each expanded term is evaluated separately at step 107 and the results are collected at step 108, such that duplicates are ignored, and step 109 shows the end of the process of the present application.

Figure 2A:
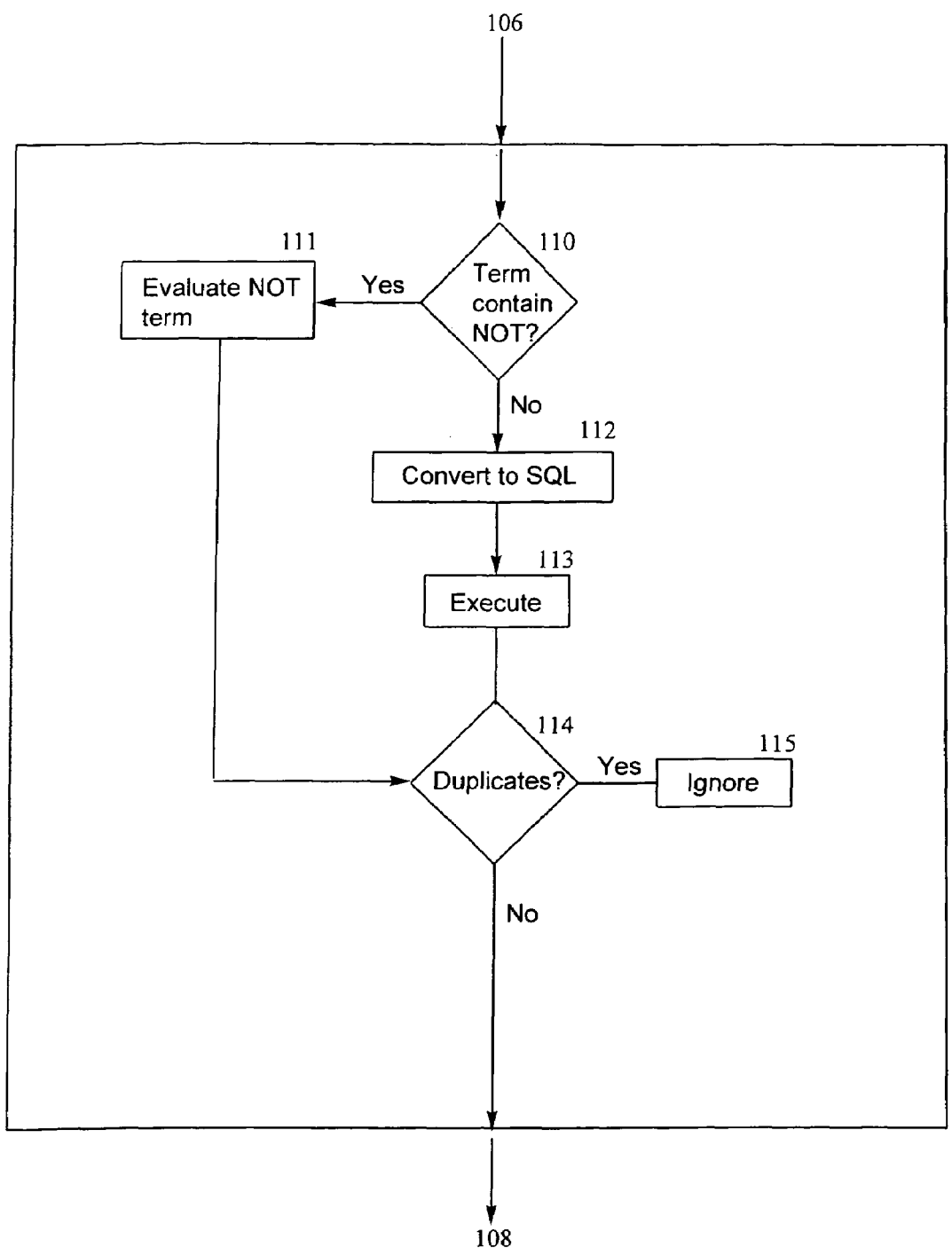
FIG. 2a illustrates schematically in more detail a method of evaluating terms.

The step 107 of evaluating each term is further illustrated in FIG. 2a. From step 106 (FIG. 2), step 110 determines whether the term involves a NOT operator. If the term involves a NOT operator, the term is evaluated at step 111, which will be more fully detailed with reference to FIG. 2b. If the term does not involve a NOT operator, at step 112 the term is converted to SQL, and the SQL executed at step 113. Step 114 tests the results of the executed SQL for duplicates. If the results are a duplicate, the result is ignored at step 115. If the result is not a duplicate, the result proceeds to step 108 (FIG. 2).

Figure 2B:
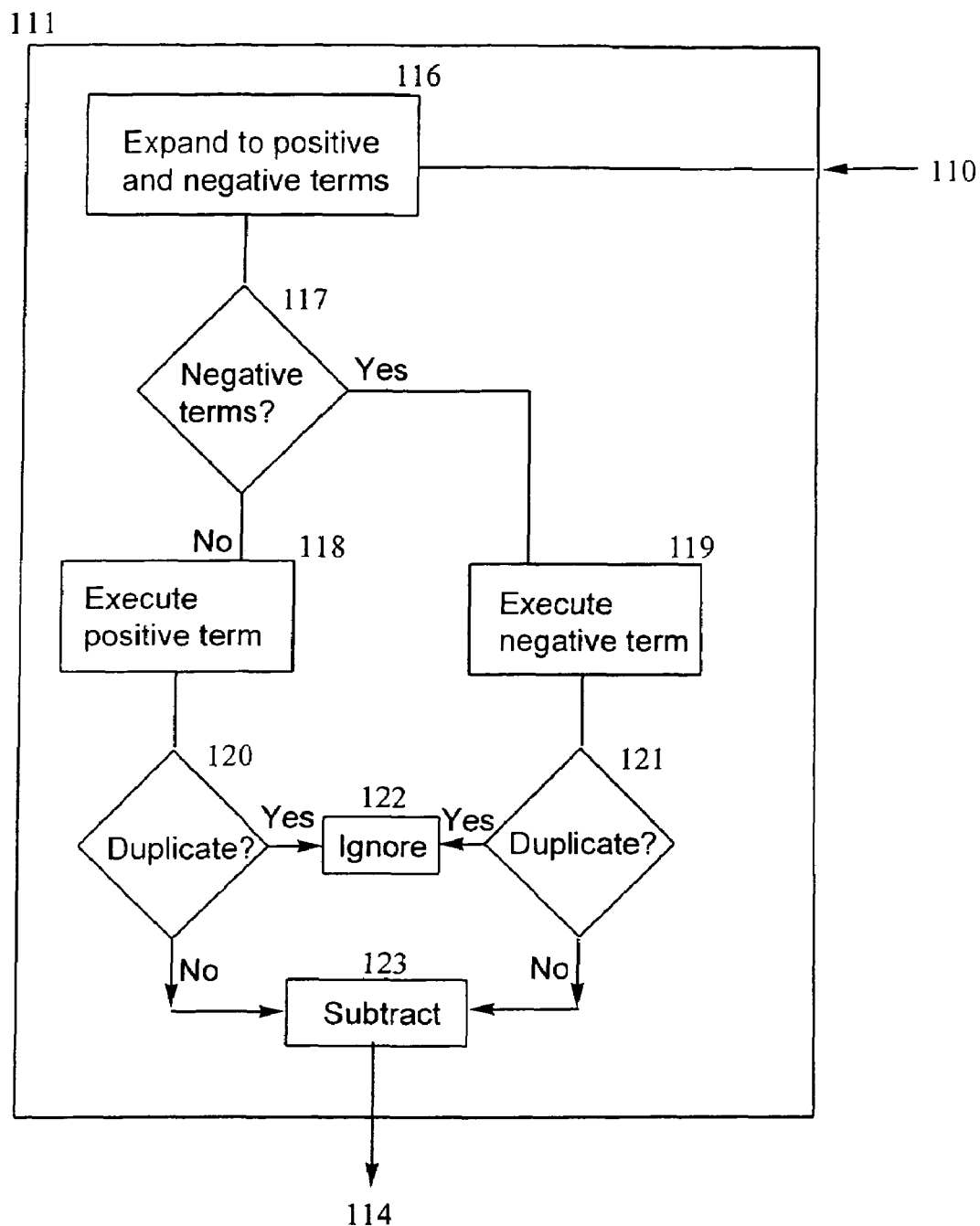
FIG. 2b illustrates schematically in more detail a method of evaluating NOT terms.

The step 111 of evaluating a NOT term is further illustrated in FIG. 2b. From step 110, the term containing a NOT is expanded, which may result in positive and/or negative terms. The process illustrated in FIG. 2b then diverges at step 117, one for positive terms, one for negative terms. At step 118, positive terms are executed. Step 120 tests the results of step 118 for duplicates. If the results are duplicates they are ignored (step 122). At step 119, negative terms are executed. Step 121 tests the results of step 119 for duplicates. If the results are duplicates they are ignored (step 122). Both positive and negative terms, which each are non-duplicate, are then subtracted at step 123. The result of the subtraction is passed to step 114 (FIG. 2a).

A further description of the method of the present application is now provided with reference to the examples below.

Example 1

Represent Query as an Expression

A service query can be represented mathematically as an equation. It is not necessary to represent a service query as an equation, but for the purposes of illustrating the method of the present application referring to an equation, does help to explain the present invention.

Expression 201 represents a general service query:

A.(B+C.!D), expression 201

Expand Expression Using Known Principles of Logic

For the purpose of illustration, to expand an expression representing a service query known principles of logic is applied to the service query.

Using known principles, expression 201 can be expanded to produce what we call a sum of terms. In this example, the sum of terms for expression is:

$\Sigma_{terms} = A.B + A.C.!D$   expression 202

The sum of terms represents the service query, i.e., the expression representing the service query, as an expression of OR of AND operators. This is what we can call a simple sum of terms.

The sum of terms provides a number of opportunities for further optimization:
1. opportunity to flatten terms
2. opportunity to stop processing if time or size limit hit
3. opportunity to evaluate terms in any order
4. opportunity to evaluate terms in parallel
5. opportunity to evaluate NOTs using a subtraction Using known translation techniques equation 201 can be translated into an SQL instruction which, by inspection, could be degenerated into a nested set of SQL instructions using AND, OR and NOT operators. However, this is a general technique that results in slow performance. On a multi-million row table, it could take hours to execute an instruction, such as the search instruction represented by expression 201.

The present application provides improved performance over known translation techniques by avoiding nested SQL instructions. Nested instructions are removed by simplifying the expression representing the service query, e.g., expression 201, to a set of terms. Each term is then converted into a flatten query involving zero or more join(s) operations. In this way, a relatively long expression, such as expression 201, can be converted into a number of smaller instructions (or expressions), each of which can be flattened. The flattened and smaller instructions (or expressions) run much faster than the complex queries, thus improving performance. In addition, to further improve performance, the database could be configured to could choose the best technique of evaluating or processing the flattened terms.

Evaluating Each Sum Term Separately from the Expanded Expression

The method according to the present application can also improve performance of database queries by removing OR operators from the simplified expression. An OR operator can be removed in a sum of terms by evaluating each term as a separate SQL instruction. The applications builds the full result from all the partial results by summing all the partial results whilst ignoring duplicates. In effect, the summation that the OR is performing is done by the application. Opportunities for further optimizations are noted above.

By applying known principles of logic (e.g., DeMorgan's theorem) to simplify the complex expression representing the service query, the OR operators have been pushed to the top and the AND operators have been pushed below the OR operators. In other words, in a relatively complex expression representing a service query, an inner nested OR operator gets multiplied out or expanded so that it 'pops' to the top. The method according to the present application can then remove the OR operators by processing (or evaluating) each term separately. In this manner, a relatively complex expression, such as expression 201, can be expanded out and executed separately so as to avoid nested SQL OR instruction performance liabilities.

Evaluating a Term Containing a not Operator from an Expanded Expression

If a term with one or more NOT operators is to be flattened, the method according to the present application preferably rewrites the term as an expression without NOT operators.

For example, the term A.!B can be expressed as A.(1−B), which can be written as A−AB. This expression no longer includes the NOT operator.

As another example, if a service query is represented as expression 203 below $$A.C.!D \qquad \text{expression 203}$$

Boolean logic can be used to further expand the expression or a sum of terms, so that expression 203 can be expressed as:

$$A.C-A.C.D \qquad \text{expression 204}$$

This expanded form of expression 203 no longer includes the NOT operator.

It should be noted that a database that supports SQL may not supply a subtraction operator. In such instances a problem in processing the sum of terms as described above may arise. In order to process (or evaluate) a subtraction, the method according to the present application: collects all positive terms in a list; collects all negative terms into another list; and then subtracts the positive term list and the negative term list whilst ignoring duplicates.

An alternative to the subtraction process noted above, is to collect all negative terms in a list, and in the process of collecting all positive terms in another list, only keep the terms that are not in the negative list. As a result, this positive list will have the subtracted results.

Evaluating a Term Having More than One not Operator from Higher Order Subtractions Expression 205 represents a service query with high order subtractions:

$$A.!B.!C \qquad \text{expression 205,}$$

where "!B" is "NOT B" and "!C" is "NOT C".

Expression 205 can be further expanded as follows:

$$A(1-B).(1-C) \qquad \text{expression 206,}$$

$$A.(1-C-B+B.C) \qquad \text{expression 207}$$

$$A-A.C-A.B+A.B.C \qquad \text{expression 208}$$

Expression 208 can be further processed (or evaluated) to remove or ignore duplicate or overlapping results, where: the A operation provides a positive list; the AC operation provides a negative list; and the AB operation also provides a negative list. In order to evaluate the subtraction, the subtraction evaluation described above can be used in respect of the lists resulting from expression 208. It is to be noted that the lists can be evaluated in any order, or in parallel, or in accordance with the optimizations noted above.

By ignoring duplicate results there is no need to evaluate the term A.B.C. With reference to mathematical principals, the subtraction of A.B and A.C effectively subtracts A.B.C. twice, which is a duplicate result.

Figure 3:
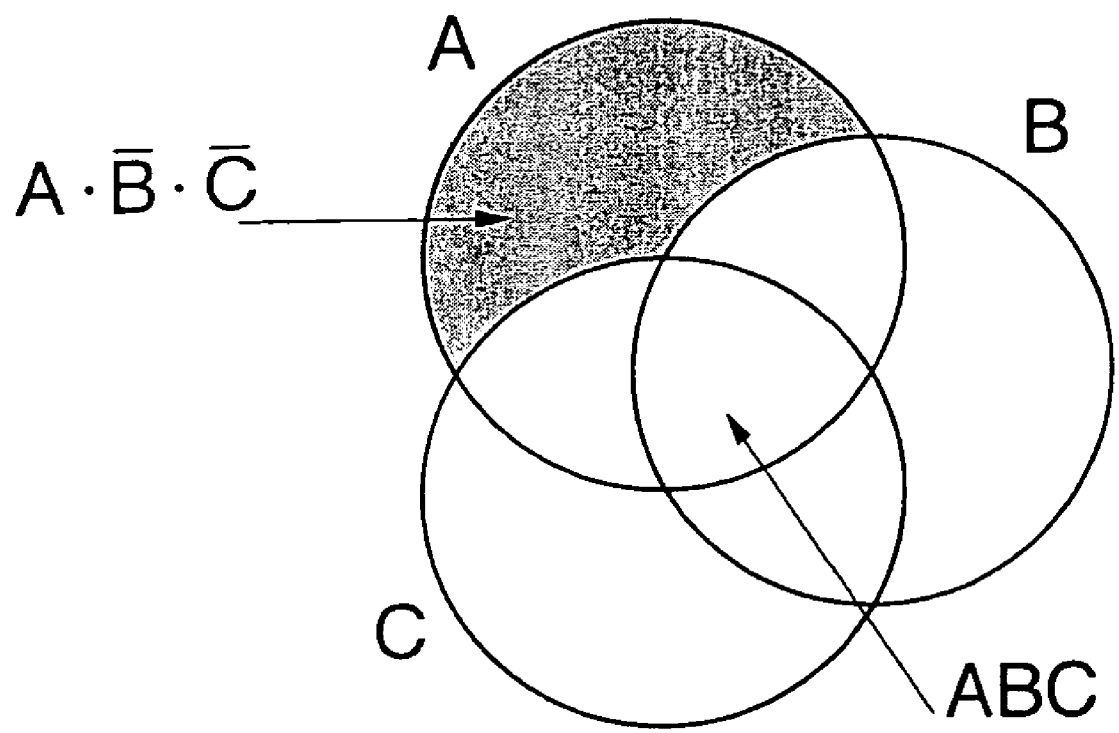
FIG. 3 illustrates graphically an equation used in explaining the method of the present application.

Looking at FIG. 3, in a mathematical sense, if we are evaluating A.!B.!C, we can evaluate all of A, then subtract AC, then subtract AB. But this means graphically we have subtracted ABC twice (once in the AB subtraction and once in the AC subtraction). This is why mathematically ABC is again added in. In the present application, however, in executing service queries, results are listed, and it is realised that AC and AB have an overlapping portion called ABC. This overlap is considered a duplicate because the results found by ABC have already been listed in AC and AB and thus they do not need to be again listed. The results of ABC are therefore not listed. Nor does the term ABC need to be evaluated as it will not be listed (added back in as was the case in the mathematical explanation). Each of these operations, A, AC, AB, some of which include AND operators can be evaluated separately and can be flattened out, without the need for subselects.

Note that A.!B.!C is an order 3 term, but this can be evaluated by A−AC−AB, which contains no greater than order 2 terms. Thus the implementation using subtraction lists is considered very efficient and results in improved database query performance.

It is clear that the method according to the present application can be generally applied to the evaluation/execution of database service queries. The present application should not be limited to the examples disclosed herein, and the expressions referenced herein are used for illustrative purposes. Clearly, the invention described in the present application can be used in respect of many different service queries, whether or not represented by equations of different simplicity or complexity.

I claim:

1. A method of processing a database service query, comprising:
   receiving a service query,
   obtaining a sum of terms associated with the service query by expanding at least one nested term into one or more un-nested terms,
   evaluating the sum of terms as a plurality of SQL instructions, wherein the sum of terms comprises one or more positive terms and one or more negative terms,
   determining a plurality of results associated with the sum of terms by executing, using a processor, the SQL instructions,
   collecting, into a first list, any of the results associated with the one or more negative terms,
   collecting, into a second list, any of the results associated with the one or more positive terms while omitting from the second list any of the results that are in the first list, and
   providing one or more of the results from the second list to a user.

2. The method as claimed in claim 1, further comprising expanding each term to remove NOT operators.

3. The method as claimed in claim 2, wherein the sum of terms are expanded using Boolean logic.

4. The method as claimed in claim 1, in which the service query is an X.500 or LDAP service query.

5. The method as claimed in claim 1, in which the service query is a search service query.

6. The method of claim 1 wherein:
   evaluating the sum of terms comprises converting the sum of terms to a plurality of SQL instructions comprising at least one negative term;
   and further comprising:
   subtracting at least one of the results associated with the at least one negative term.

7. The method of claim 1, wherein obtaining a sum of terms comprises:
   identifying at least one term associated with at least one NOT operator; and
   expanding the at least one term associated with the at least one NOT operator into at least one negative term.

8. The method of claim 1, wherein:
   if the service query comprises a term having at least two NOT operators, deleting or disregarding from the sum of terms a third-order term corresponding to the term having at least two NOT operators.

9. The method of claim 1, wherein obtaining a sum of terms comprises:
   identifying at least one term associated with at least one NOT operator; and
   expanding the at least one term associated with at least one NOT operator into at least one negative term and at least one positive term.

10. A system for processing a directory service query, comprising:
    a database operable to store arbitrary data; and
    a processor that is communicatively coupled to the database and that processes a service query by:
      obtaining a sum of terms by expanding at least one nested term into one or more un-nested terms,
      evaluating the sum of terms as a plurality of SQL instructions, wherein the sum of terms comprises one or more positive terms and one or more negative terms,
      determining a plurality of results associated with the sum of terms by executing the SQL instructions,
      collecting, into a first list, any of the results associated with the one or more negative terms,
      collecting, into a second list, any of the results associated with the one or more positive terms while omitting from the second list any of the results that are in the first list, and
      providing one or more of the results from the second list to a user.

11. The system as claimed in claim 10, further comprising means to perform X.500 or LDAP services.

12. A method of processing a directory service query, comprising:
    receiving a directory service query,
    obtaining a sum of terms by expanding at least one nested term into one or more un-nested terms,
    mapping the sum of terms to a plurality of SQL instructions, wherein the sum of terms comprises one or more positive terms and one or more negative terms,
    determining a plurality of results associated with the sum of terms by executing, using a processor, the SQL instructions,
    collecting, into a first list, any of the results associated with the one or more negative terms,
    collecting, into a second list, any of the results associated with the one or more positive terms while omitting from the second list any of the results that are in the first list, and
    providing one or more of the results from the second list to a user.

13. The method as claimed in claim 12, further comprising expanding each term to remove NOT operators.

14. The method as claimed in claim 13, wherein the sum of terms are expanded using Boolean logic.

15. The method as claimed in claim 12, in which the directory service query is an X.500 or LDAP service query.

16. The method as claimed in claim 12, in which the directory service query is a search service query.

17. A system for processing a directory service query, comprising:
    a database that is operable to store arbitrary data; and
    a processor that is communicatively coupled to the database and that processes a directory service query by:
      obtaining a sum of terms by expanding at least one nested term into one or more un-nested terms,
      mapping the sum of terms to a plurality of SQL instructions, wherein the sum of terms comprises one or more positive terms and one or more negative terms,
      determining a plurality of results associated with the sum of terms by executing the SQL statements,
      collecting, into a first list, any of the results associated with the one or more negative terms, and
      collecting, into a second list, any of the results associated with the one or more positive terms while omitting from the second list any of the results that are in the first list, and
      providing only the results from the second list to a user.

18. The system as claimed in claim 17, further comprising means to perform X.500 or LDAP services.

19. A method of processing a database service query, comprising:
    receiving a service query;
    obtaining a sum of terms associated with the service query by:
      expanding at least one nested term into one or more un-nested terms;

expanding at least one term associated with at least one NOT operator into at least one negative term and at least one positive term; and if the service query comprises a term having at least two NOT operators, deleting from the sum of terms a third-order term corresponding to the term having at least two NOT operators;

evaluating the sum of terms as a plurality of SQL instructions;

obtaining a plurality of results by executing, using a processor, the SQL instructions, wherein each term of the sum of terms is associated with one or more of the results;

generating a first list comprising one or more of the results associated with the at least one negative term;

generating a second list comprising one or more of the results associated with the at least one positive term, wherein the first list and the second list are generated by the processor;

removing or omitting from the second list at least one of the results associated with the at least one negative term; and providing one or more of the results from the second list to a user.

* * * * *

UNITED STATES PATENT AND TRADEMARK OFFICE
CERTIFICATE OF CORRECTION

PATENT NO. : 7,617,183 B1  Page 1 of 1
APPLICATION NO. : 09/721806
DATED : November 10, 2009
INVENTOR(S) : Richard Hans Harvey It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 362 days.

Signed and Sealed this

Nineteenth Day of October, 2010

David J. Kappos
*Director of the United States Patent and Trademark Office*